(12) United States Patent
Zeh et al.

(10) Patent No.: US 11,849,024 B2
(45) Date of Patent: *Dec. 19, 2023

(54) GENERATING HASH VALUES

(71) Applicant: Infineon Technologies AG, Neubiberg (DE)

(72) Inventors: Alexander Zeh, Munich (DE); Laurent Heidt, Sauerlach (DE); Stefan Koeck, Ottenhofen (DE)

(73) Assignee: Infineon Technologies AG, Neubiberg (DE)

(*) Notice: Subject to any disclaimer, the term of this patent is extended or adjusted under 35 U.S.C. 154(b) by 0 days.

This patent is subject to a terminal disclaimer.

(21) Appl. No.: 17/872,253

(22) Filed: Jul. 25, 2022

(65) Prior Publication Data

US 2022/0368516 A1 Nov. 17, 2022

Related U.S. Application Data

(63) Continuation of application No. 17/038,307, filed on Sep. 30, 2020, now Pat. No. 11,398,897.

(30) Foreign Application Priority Data

Oct. 10, 2019 (DE) .......................... 102019127335.8

(51) Int. Cl.
*H04L 9/06* (2006.01)
*H04L 9/32* (2006.01)
*H04L 9/08* (2006.01)

(52) U.S. Cl.
CPC .......... *H04L 9/0643* (2013.01); *H04L 9/0866* (2013.01); *H04L 9/0877* (2013.01); *H04L 9/3252* (2013.01)

(58) Field of Classification Search
CPC ... H04L 9/0643; H04L 9/0866; H04L 9/0877; H04L 9/3252; H04L 2209/122; H04L 2209/84; H04L 9/0897; H04L 9/0869; G06F 21/602
See application file for complete search history.

(56) References Cited

U.S. PATENT DOCUMENTS

| 6,704,871 B1 | 3/2004 | Kaplan et al. |
| 10,938,961 B1* | 3/2021 | Ponnala ................. G06F 16/174 |
| 11,398,897 B2 | 7/2022 | Zeh et al. |
| 2002/0066014 A1 | 5/2002 | Dworkin et al. |
| 2009/0147947 A1* | 6/2009 | Ingimundarson ..... H04L 9/0643 380/29 |

(Continued)

FOREIGN PATENT DOCUMENTS

| CN | 109905228 A | 6/2019 |
| CN | 110266500 A | 9/2019 |

(Continued)

*Primary Examiner* — Mohammed Waliullah
(74) *Attorney, Agent, or Firm* — Harrity & Harrity, LLP

(57) ABSTRACT

A device is suggested for processing input data including a hardware accelerator generating a first hash value based on a first portion of the input data and a second hash value based on a second portion of the input data, wherein the first hash value is generated based on a first configuration of the hardware accelerator and wherein the second hash value is generated based on a second configuration of the hardware accelerator. Also, a method for operating such device is provided.

23 Claims, 2 Drawing Sheets

(56) References Cited

U.S. PATENT DOCUMENTS

| | | | |
|---|---|---|---|
| 2009/0262925 A1 | 10/2009 | Mjayarangan | |
| 2010/0106976 A1* | 4/2010 | Aciicmez | H04L 9/0643 |
| | | | 713/189 |
| 2011/0153861 A1* | 6/2011 | Chauhan | H04L 69/22 |
| | | | 709/232 |
| 2015/0033035 A1 | 1/2015 | Haid et al. | |
| 2016/0292201 A1* | 10/2016 | Asaad | G06F 16/24569 |
| 2016/0315762 A1 | 10/2016 | Moon et al. | |
| 2018/0121369 A1 | 5/2018 | Poeppelmann et al. | |
| 2018/0173731 A1* | 6/2018 | Nazari | G06F 16/215 |
| 2018/0183577 A1 | 6/2018 | Suresh et al. | |
| 2019/0327087 A1* | 10/2019 | Deleeuw | H04L 67/1002 |
| 2020/0394338 A1* | 12/2020 | Castelnuovo | H04L 9/3239 |

FOREIGN PATENT DOCUMENTS

| | | | |
|---|---|---|---|
| JP | 2011091517 A | 5/2011 | |
| KR | 20080041930 A | 5/2008 | |
| KR | 20170037641 A | 4/2017 | |
| WO | 2011005869 A2 | 1/2011 | |

* cited by examiner

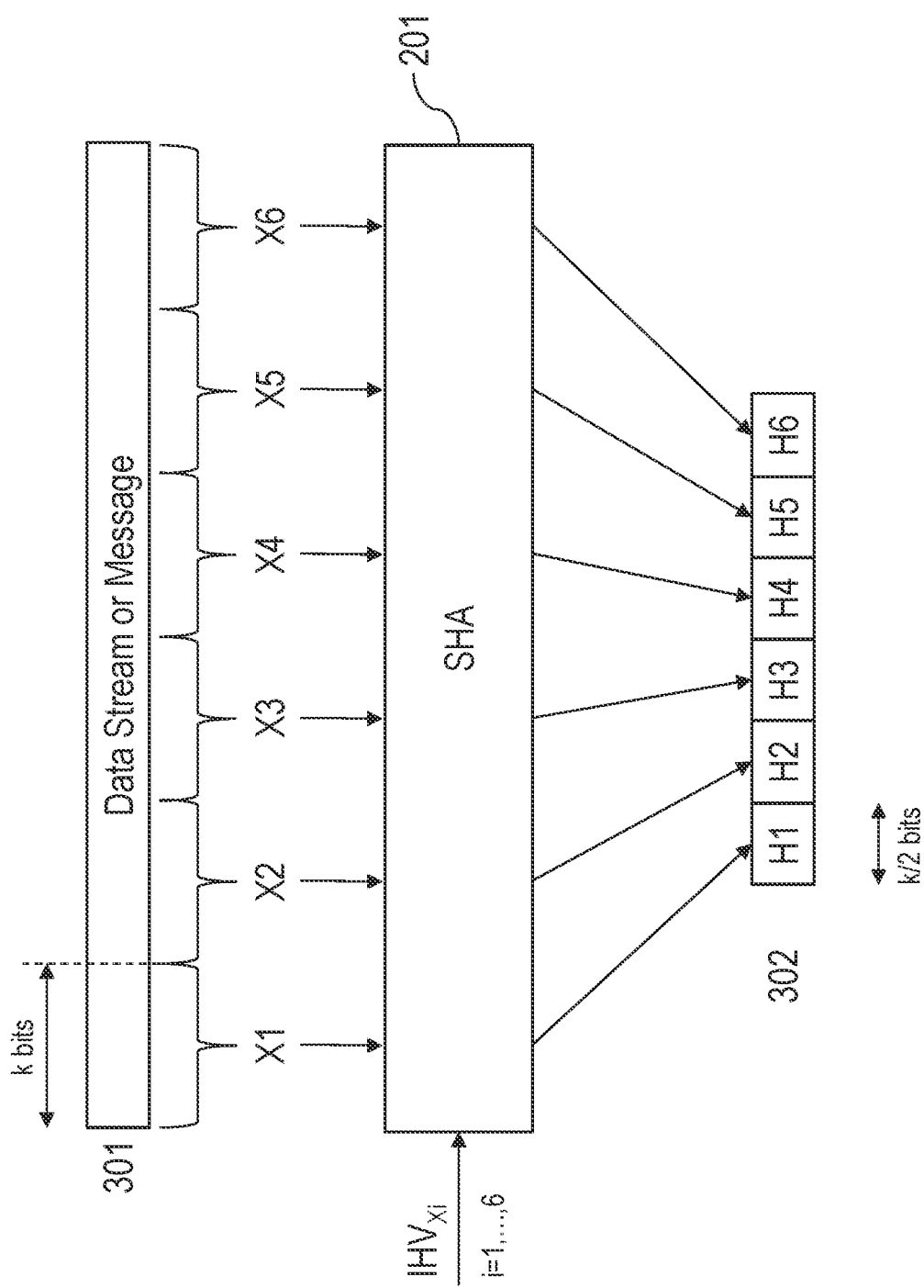

GENERATING HASH VALUES

CROSS-REFERENCE TO RELATED APPLICATIONS

This application is a continuation of U.S. patent application Ser. No. 17/038,307 filed Sep. 30, 2020, which claims the benefit of German Patent Application No. 102019127335.8 filed Oct. 10, 2019, which are incorporated by reference as if fully set forth.

BACKGROUND

There are various cryptographic applications that require hash values. One example are digital signature schemes that utilize signatures to detect unauthorized modifications of data as well as authenticate an identity of a signatory.

The data may in particular be a random number of characters, e.g., bytes, that needs to be tailored to a particular size or to portions of a particular size in order to fit a signature algorithm, which is capable of processing this predefined number of bytes.

Secure Hash Algorithms (SHAs) are known as a family of cryptographic hash functions published by the National Institute of Standards and Technology (NIST) as a U.S. Federal Information Processing Standard (FIPS). Details on the SHAs can be found at, e.g., https://en.wikipedia.org/wiki/Secure Hash Algorithms. Each of these algorithms provides an output of a predetermined size (i.e. number of bits).

For example, an Edwards-curve Digital Signature Algorithm (EdDSA, see, e.g., https://en.wikipedia.org/wiki/EdDSA) is a digital signature scheme utilizing public-key cryptography. The EdDSA may require an SHA-2 512 hash function.

It is therefore an objective to provide a solution that can efficiently provide in particular long hash values.

SUMMARY

One or more objectives is solved according to the features of the independent claims. Further embodiments result from the depending claims.

The examples suggested herein may in particular be based on at least one of the following solutions. Combinations of the following features may be utilized to reach a desired result. The features of the method could be combined with any feature(s) of the device, apparatus or system or vice versa.

A device is provided for processing input data including:
a hardware accelerator generating
a first hash value based on a first portion of the input data and
a second hash value based on a second portion of the input data,
wherein the first hash value is generated based on a first configuration of the hardware accelerator and
wherein the second hash value is generated based on a second configuration of the hardware accelerator.

A single hardware (HW) accelerator generates two hash values based on different configurations of the hardware accelerator.

The first configuration and the second configuration of the hardware accelerator are preferably different from each other.

The first portion of the input data and the second portion of the input data may at least partially be based on different bits of the input data.

The hardware accelerator may provide a hash function that compiles a hash value based on a portion of the input data and a configuration.

The term hardware accelerator in this regard merely indicates a hardware unit that is capable of compiling values based on a hash function.

The hardware accelerators may provide a hash value that has less bits than input bits used for generating the respective hash value.

According to an embodiment, output data is generated based on the first hash value and the second hash value.

Hence, the solution presented introduces an efficient hardware solution to supply output data that corresponds to a (combined) hash value with a large number of bits, which can then be used, e.g., for any subsequent cryptographic operation that requires a large hash value (with many bits).

According to an embodiment, the hardware accelerator implements one of the following hash functions:
an algorithm of the SHA family, in particular SHA-2-256, SM3.

According to an embodiment, the input data is distributed in even portions to the hardware accelerator.

According to an embodiment, wherein the input data is multiplexed to the hardware accelerator.

According to an embodiment, the input data is a data stream.

According to an embodiment, the second input data includes a portion of the first input data or vice versa.

According to an embodiment, the first hash value and the second hash value are concatenated and supplied as output data.

According to an embodiment,
the first configuration includes a first initial hash value that is used by the hardware accelerator to generate the first hash value,
the second configuration includes a second initial hash that is used by the hardware accelerator to generate the second hash value.

The first initial hash value and the second initial hash value are preferably different from each other.

According to an embodiment, the first initial hash value and the second initial hash value are determined based on at least one random number or at least one pseudo random number.

A random number or a pseudo random number may be generated by the device, in particular by the first and/or second hardware accelerator and/or such number may be supplied by another device or function.

It is an option that the first initial hash value and the second initial hash value are determined based on a common seed.

A seed may be a number (or vector), which could be used to initialize a (pseudo)random number generator. It is in particular an option that the seed is used to generate several (e.g., pseudo-random) numbers (or vectors) that may at least partially be used as initial hash values.

According to an embodiment, the first initial hash value is determined based on the second initial hash value or vice versa.

According to an embodiment, the first initial hash value and/or the second initial hash value have a limited life-span.

According to an embodiment, the first initial hash value and/or the second initial hash value change after n calculations of hash values, wherein n is equal to or larger than one.

Hence, the initial hash value for each of the hash functions may be re-calculated after it has been used at least once.

According to an embodiment, the output data is used in a cryptographic operation.

The output data may be used, e.g., in an Elliptic Curve Digital Signature Algorithm (ECDSA).

According to an embodiment, the device may be part of a hardware security module or a cryptographic device.

Also, a vehicle is suggested including at least one device according to any of the preceding claims.

Further, a method is provided for processing input data including:

generating a first hash value based on a first portion of the input data and generating a second hash value based on a second portion of the input data, wherein the first hash value is generated based on a first configuration of the hardware accelerator and wherein the second hash value is generated based on a second configuration of the hardware accelerator.

In addition, a computer program product is suggested, which is directly loadable into a memory of a digital processing device, including software code portions for performing the steps of the method as described herein.

BRIEF DESCRIPTION OF THE DRAWINGS

Embodiments are shown and illustrated with reference to the drawings. The drawings serve to illustrate the basic principle, so that only aspects necessary for understanding the basic principle are illustrated. The drawings are not to scale. In the drawings the same reference characters denote like features.

FIG. 3 shows an exemplary diagram indicating how input data, e.g., a data stream or message, can be partitioned into several portions X1 to X6 of the input data and processed to generated hash values H1 to H6.

DETAILED DESCRIPTION

As indicated, the EdDSA may require an SHA-2 512 hash function supplying an output of 512 bits. In order to compile a signature quickly, the EdDSA may be implemented in hardware. Hence, it is an exemplary objective to also provide a sufficient message digest length (i.e. output bits of a hash function) to meet the requirements of the EdDSA and thus be able to quickly compile the signature.

One exemplary solution is to provide a hardware (HW) accelerator that is able to rapidly supply hash values (output bits of a hash function) of different sizes.

In an exemplary use-case scenario, the EdDSA as well as the hash function are implemented in hardware. This approach is in particular beneficial in case a large amount of data needs to be processed.

It is an option that a hardware accelerator is able to generate a hash value (of a predetermined size). The hash value depends on input data and on a configuration. The configuration may be or it may comprise an initial hash value (IHV).

Figure 1:
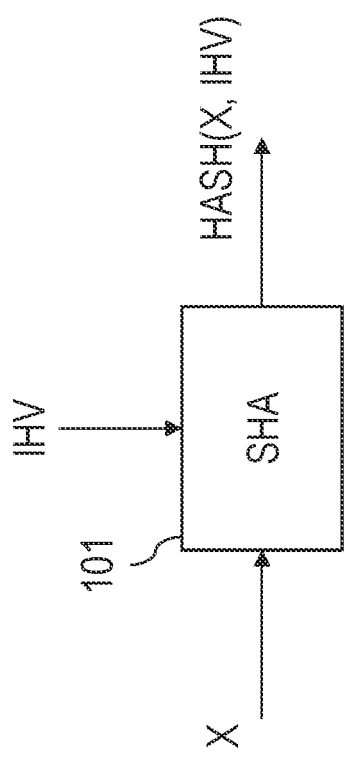
FIG. 1 shows an exemplary block diagram of a hardware accelerator that is capable of providing a hash value HASH (X, IHV) based on an input X and an initial hash value IHV.

FIG. 1 shows an exemplary block diagram of a hardware accelerator 101 that is capable of providing a hash value HASH(X, IHV) based on an input X and an initial hash value IHV. The input X may be any input data, e.g., a message or data stream, which may be divided into portions of a size that is computable by the hardware accelerator.

In an exemplary embodiment, the hardware accelerator 101 processes an input of 512 bits to generate a hash value of 256 bits. Of course, other input and/or output sizes are possible. An exemplary reference is made to https://en.wikipedia.org/wiki/Secure Hash Algorithms, showing a table visualizing different input and output sizes of different SHAs.

Figure 2:
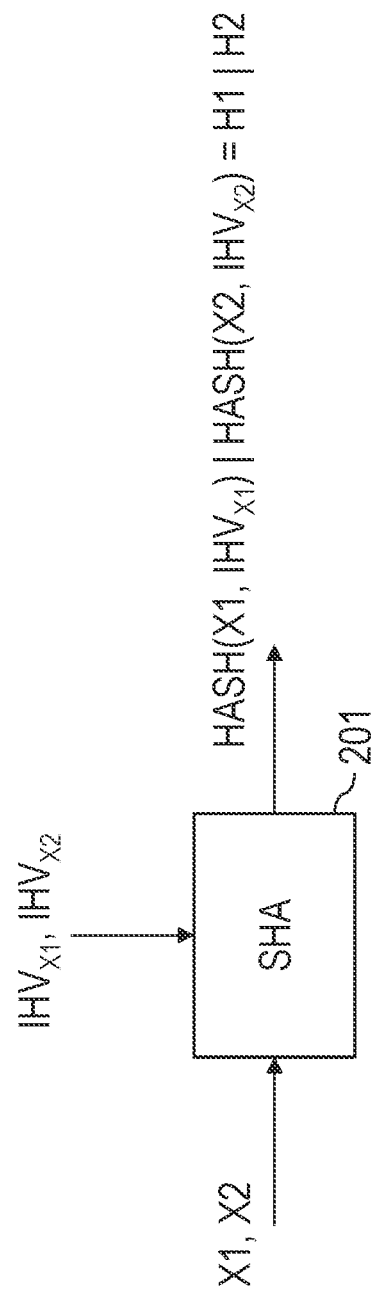
FIG. 2 shows an exemplary block diagram utilizing a single hardware accelerator to generate different hash values based on different configurations.

FIG. 2 shows an exemplary block diagram utilizing a single hardware accelerator 201 to generate different hash values based on different configurations.

In this example input data may comprise a first portion of input data X1 and a second portion of input data X2.

The input data may be a message or a data stream or any input data that is subject to a transformation towards hash values.

For example, the hardware accelerator 201 may provide a hash function according to the SHA-256; in such exemplary scenario, the first portion of input data X1 and the second portion of input data each comprises 512 bits.

The SHA-256 supplies 256 output bits based on 512 input bits.

Hence, a hash value $H1=HASH(X1, IHV_{X1})$ of 256 bits is generated based on the first portion of input data X1 and a configuration of the hardware accelerator 201, which in this example is an initial hash value $IHV_{X1}$.

Accordingly, a hash value $H2=HASH(X2, IHV_{X2})$ of 256 bits is generated based on the second portion of input data X2 and a configuration of the hardware accelerator 201, which in this example is an initial hash value $IHV_{X2}$.

Preferably, the initial hash values used on different portions of the input data differ from each other by at least one bit.

According to the example shown in FIG. 2, the input data X is divided into two portions of input data X1 and X2 and each of these portions is processed subsequently by the hardware accelerator 201 utilizing different configurations $IHV_{X1}$ and $IHV_{X2}$ to generate the hash values H1 and H2, which can be concatenated (as indicated by the notation H1|H2) for further processing, e.g., in a cryptographic function or application.

Due to the different configuration used, there is a high probability that the hash values H1 and H2 will be different even if the bits of the input data X1 and X2 are identical. Hence, utilizing different configurations of the hardware accelerator increases the entropy of the supplied hash values.

A different $IHV_{in}$ may be supplied for each computation of a hash value based on a portion of the input data in. As an option, a set of different IHV values may be provided and chosen according to a round-robin scheme based on a deterministic or random or pseudo-random selection.

Such set of IHV values may be stored with the hardware accelerator.

Also, a deterministic, pseudo-random or random algorithm may be used to generate the IHV values or at least portions thereof. It is another option that the IHV values are based on at least one seed value provided by the hardware accelerator or by an external device.

FIG. 3 shows an exemplary diagram indicating how input data 301, e.g., a data stream or message, can be partitioned into several portions X1 to X6 of input data. Each portion of input data has the length of k bits.

Of course, it is also an option that the input data 301 have a predefined length and/or the number of portions and/or the lengths of the portions may vary.

The portions of input data X1 to X6 are subsequently fed to the hardware accelerator 201 (see also FIG. 2), which generates a hash value H1 to H6 for each of the input data X1 to X6 based on a dedicated configuration $IHV_{X1}$ to $IHV_{X6}$.

The resulting hash values H1 to H6 are exemplarily depicted as a concatenated (combined) hash value 302.

In the example mentioned above, the hardware accelerator may implement the SHA-256, wherein each of the portions of input data X1 to X6 comprises 512 bits and each of the resulting hash values H1 to H6 comprises 256 bits. Hence, in this example the size of k=512 bits is divided in half.

It is noted, however, that the hardware accelerator may employ different implementations. For example, an SM3 or any other hash function can be implemented. Also, the ratio of $X_i/H_i$ may vary and may in particular be different from two.

There exist various ways to implement the solution presented herein. In one example, the respective portion of input data together with its associated configuration may be applied to the hardware accelerated by a multiplexer. This ensures that the hardware accelerator can be used to subsequently generate the hash values (which may then be concatenated).

As an advantage, only a single hardware accelerator can be used to generate lengthy hash values. This is beneficial, because the hardware accelerator is faster than a software implementation and reducing the number of hardware accelerators bears the advantage that only reduced or minimized space is required on a chip.

In one or more examples, the functions described herein may be implemented at least partially in hardware, such as specific hardware components or a processor. More generally, the techniques may be implemented in hardware, processors, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium, i.e., a computer-readable transmission medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

Instructions may be executed by one or more processors, such as one or more central processing units (CPU), digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a single hardware unit or provided by a collection of interoperative hardware units, including one or more processors as described above, in conjunction with suitable software and/or firmware.

Although various exemplary embodiments of the invention have been disclosed, it will be apparent to those skilled in the art that various changes and modifications can be made which will achieve some of the advantages of the invention without departing from the spirit and scope of the invention. It will be obvious to those reasonably skilled in the art that other components performing the same functions may be suitably substituted. It should be mentioned that features explained with reference to a specific figure may be combined with features of other figures, even in those cases in which this has not explicitly been mentioned. Further, the methods of the invention may be achieved in either all software implementations, using the appropriate processor instructions, or in hybrid implementations that utilize a combination of hardware logic and software logic to achieve the same results. Such modifications to the inventive concept are intended to be covered by the appended claims.

What is claimed is:

1. A security device for securely processing input data with high cryptographic entropy of a hash value generation, comprising:
   a hardware accelerator configured to generate a first hash value based on a first portion of the input data and generate a second hash value based on a second portion of the input data, wherein the hardware accelerator is configured to generate the first hash value based on a first configuration of the hardware accelerator, wherein the hardware accelerator is configured to generate the second hash value based on a second configuration of the hardware accelerator that is different from the first configuration of the hardware accelerator, wherein the first configuration comprises a first initial hash value and the second configuration comprises a second initial hash value that differs from the first initial hash value to increase a cryptographic entropy of the hash value generation of the first and the second hash values, wherein the hardware accelerator is configured to generate the first hash value using the first initial hash value and generate the second hash value using the second initial hash value such the first hash value and the second hash value are different with high probability, and wherein the hardware accelerator is configured to change at least one of the first initial hash value and the second initial hash value after n calculations of hash values, wherein n is equal to or larger than one, wherein the hardware accelerator is configured to maintain the high cryptographic entropy of the hash value generation by maintaining that the first initial hash value and the second initial hash value are different from each other such the first hash value and the second hash value are different with high probability.

2. The security device according to claim 1, wherein output data is generated based on the first hash value and the second hash value.

3. The security device according to claim 1, wherein the hardware accelerator is configured to generate the first hash value and the second hash value according to one of the following hash functions:
an algorithm of a secure hash algorithm (SHA) family, in particular SHA-2-256, or SM3.

4. The security device according to claim 1, wherein the input data is distributed in even portions, including the first portion and the second portion, to the hardware accelerator.

5. The security device according to claim 1, wherein the input data is multiplexed to the hardware accelerator to provide the first portion and the second portion.

6. The security device according to claim 1, wherein the second portion comprises a portion of the first portion or vice versa.

7. The security device according to claim 1, wherein the hardware accelerator is configured to concatenate the first hash value and the second hash value and output the concatenated first and second hash values as output data.

8. The security device according to claim 1, wherein the hardware accelerator comprises at least one random number generator and the hardware accelerator is configured to determine the first initial hash value and the second initial hash value based on at least one random number or at least one pseudo random number generated by the random number generator.

9. The security device according to claim 1, wherein the hardware accelerator is configured to determine the first initial hash value based on the second initial hash value or vice versa.

10. The security device according to claim 1, wherein the security device is part of a hardware security module or a cryptographic device.

11. The security device according to claim 1, wherein, for each iteration of the input data that is received by the hardware accelerator, the hardware accelerator is configured to select or generate a different set of configuration pairs for use as the first configuration and the second configuration.

12. The security device according to claim 1, wherein the hardware accelerator is configured to select or generate a different hash value for the first initial hash value after n calculations of first hash values using the first initial hash value, wherein n is equal to or larger than one, wherein the hardware accelerator is configured to maintain that the first initial hash value and the second initial hash value are different from each other.

13. The security device according to claim 12, wherein the hardware accelerator is configured to select or generate a different hash value for the second initial hash value after n calculations of second hash values using the second initial hash value, wherein n is equal to or larger than one, wherein the hardware accelerator is configured to maintain that the first initial hash value and the second initial hash value are different from each other.

14. The security device according to claim 12, wherein the hardware accelerator comprises at least one random number generator and the hardware accelerator is configured to select or generate each hash value of the first initial hash value based on at least one random number or at least one pseudo random number generated by the random number generator.

15. A method for processing input data to provide high cryptographic entropy of a hash value generation, the method comprising:
generating, by a hardware accelerator, a first hash value based on a first portion of the input data;
generating, by the hardware accelerator, a second hash value based on a second portion of the input data,
wherein the first hash value is generated based on a first configuration of the hardware accelerator,
wherein the second hash value is generated based on a second configuration of the hardware accelerator that is different from the first configuration of the hardware accelerator,
wherein the first configuration comprises a first initial hash value and the second configuration comprises a second initial hash value that differs from the first initial hash value to increase a cryptographic entropy of the hash value generation of the first and the second hash values, and
wherein the first hash value is generated using the first initial hash value and the second hash value is generated using the second initial hash value such the first hash value and the second hash value are different with high probability;
changing, by the hardware accelerator, at least one of the first initial hash value and the second initial hash value after n calculations of hash values, wherein n is equal to or larger than one; and
maintaining, by the hardware accelerator, the high cryptographic entropy of the hash value generation by maintaining that the first initial hash value and the second initial hash value are different from each other such the first hash value and the second hash value are different with high probability.

16. A non-transitory computer-readable medium having recorded thereon a computer program product directly loadable into a memory of a digital processing device, the computer program product comprising software code portions for performing a method for processing input data to provide high cryptographic entropy of a hash value generation, the method comprising:

generating, by a hardware accelerator, a first hash value based on a first portion of the input data;

generating, by the hardware accelerator, a second hash value based on a second portion of the input data, wherein the first hash value is generated based on a first configuration of the hardware accelerator, wherein the second hash value is generated based on a second configuration of the hardware accelerator that is different from the first configuration of the hardware accelerator, wherein the first configuration comprises a first initial hash value and the second configuration comprises a second initial hash value that differs from the first initial hash value to increase a cryptographic entropy of the hash value generation of the first and the second hash values, and wherein the first hash value is generated using the first initial hash value and the second hash value is generated using the second initial hash value such the first hash value and the second hash value are different with high probability;

changing, by the hardware accelerator, at least one of the first initial hash value and the second initial hash value after n calculations of hash values, wherein n is equal to or larger than one; and maintaining, by the hardware accelerator, the high cryptographic entropy of the hash value generation by maintaining that the first initial hash value and the second initial hash value are different from each other such the first hash value and the second hash value are different with high probability.

17. A security device for securely processing input data with high cryptographic entropy of a hash value generation, comprising:

a hardware accelerator configured to generate a first hash value based on a first portion of the input data and a first initial hash value and generate a second hash value based on a second portion of the input data and a second initial hash value that is different from the first initial hash value to increase a cryptographic entropy of the hash value generation of the first and the second hash values, wherein the hardware accelerator is configured to change at least one of the first initial hash value and the second initial hash value after n calculations of hash values to maintain the high cryptographic entropy of the hash value generation, wherein n is equal to or larger than one, and wherein the hardware accelerator is configured to generate the first hash value using the first initial hash value and generate the second hash value using the second initial hash value such the first hash value and the second hash value are different with high probability.

18. The security device of claim 17, wherein the hardware accelerator is configured to maintain the high cryptographic entropy of the hash value generation by maintaining that the first initial hash value and the second initial hash value are different from each other.

19. The security device according to claim 17, wherein the hardware accelerator is configured to select or generate a different hash value for the first initial hash value after n calculations of first hash values using the first initial hash value, wherein n is equal to or larger than one, wherein the hardware accelerator is configured to maintain that the first initial hash value and the second initial hash value are different from each other.

20. The security device according to claim 19, wherein the hardware accelerator is configured to select or generate a different hash value for the second initial hash value after n calculations of second hash values using the second initial hash value, wherein n is equal to or larger than one, wherein the hardware accelerator is configured to maintain that the first initial hash value and the second initial hash value are different from each other.

21. The security device according to claim 17, wherein the hardware accelerator comprises at least one random number generator and the hardware accelerator is configured to select or generate each hash value of the first initial hash value based on at least one random number or at least one pseudo random number generated by the random number generator.

22. A security device for securely processing input data with high cryptographic entropy of a hash value generation, comprising:

a hardware accelerator configured to generate a first hash value based on a first portion of the input data and a first initial hash value and generate a second hash value based on a second portion of the input data and a second initial hash value that is different from the first initial hash value to increase a cryptographic entropy of the hash value generation of the first and the second hash values, wherein, for each iteration of the input data that is received by the hardware accelerator, the hardware accelerator is configured to select or generate a different set of initial hash value pairs for use as the first initial hash value and the second initial hash value to maintain the high cryptographic entropy of the hash value generation, and wherein the hardware accelerator is configured to generate the first hash value using the first initial hash value and generate the second hash value using the second initial hash value such the first hash value and the second hash value are different with high probability.

23. The security device of claim 22, wherein the hardware accelerator is configured to maintain the high cryptographic entropy of the hash value generation by maintaining that the first initial hash value and the second initial hash value are different from each other such the first hash value and the second hash value are different with high probability.

\* \* \* \* \*